United States Patent [19]

Redman

[11] Patent Number: 4,819,527

[45] Date of Patent: Apr. 11, 1989

[54] THREADING MACHINE CHUCK

[75] Inventor: James C. Redman, Amherst, Ohio

[73] Assignee: Emerson Electric Co., St. Louis, Mo.

[21] Appl. No.: 123,719

[22] Filed: Nov. 23, 1987

[51] Int. Cl.⁴ .............................................. B23B 5/22
[52] U.S. Cl. ..................................... 82/165; 279/1 L; 279/1 DC; 279/33; 279/106
[58] Field of Search ........................... 82/40 R, 41, 42; 279/1 C, 1 H, 1 SG, 1 L, 1 DC, 33, 35, 106, 107

[56] References Cited

U.S. PATENT DOCUMENTS

| | | | |
|---|---|---|---|
| 1,095,304 | 5/1914 | Weiss | 279/33 |
| 1,488,221 | 3/1924 | Swissgable | 279/33 |
| 1,812,221 | 6/1931 | Spencer | 279/33 |
| 2,479,560 | 8/1949 | Eaton | 279/33 |
| 2,890,888 | 6/1959 | Damijonaitis | 279/35 |
| 2,916,290 | 12/1959 | Skillin | 279/106 |
| 2,980,434 | 4/1961 | Hoffman | 279/106 |
| 3,016,245 | 1/1962 | Zelewsky | 279/106 |
| 3,232,629 | 2/1966 | Obear | 279/106 |
| 3,270,592 | 9/1966 | Behnke | 77/73 |
| 3,413,667 | 12/1968 | Behnke | 10/89 |
| 3,995,869 | 12/1976 | Mazingue | 279/33 |
| 4,247,124 | 1/1981 | Wagner | 279/106 |

Primary Examiner—Frederick R. Schmidt
Assistant Examiner—Blynn Shideler
Attorney, Agent, or Firm—Body, Vickers & Daniels

[57] ABSTRACT

A rotatable chuck workpiece for a power driven threading machine is disclosed comprising a tubular spindle having front and rear ends and front and rear workpiece engaging jaws respectively at the front and rear ends. Each front jaw is connected to a corresponding rear jaw by a rod to which the jaws are rigidly attached, and the rods are mounted on the exterior of the spindle for rotation therewith and for pivotal movement relative thereto. A drive plate at the front end of the spindle is mounted coaxially thereon for pivotal movement relative to the spindle and is provided with drive pins interengaging with slots in the front jaws, whereby pivotal movement of the drive plate in opposite directions imparts pivotal movement of the front jaws radially inwardly and outwardly of the spindle axis. The front jaws and the rods to which they are attached provide the only driving connection between the drive plate and the rear jaws, whereby pivotal displacement of the front jaws imparts corresponding pivotal displacement to the rear jaws. Centering finger components are mounted on each of the front and rear jaws and operate to center a workpiece in the spindle relative to the spindle axis during pivotal movement of the jaws radially inwardly of the spindle.

29 Claims, 5 Drawing Sheets

THREADING MACHINE CHUCK

BACKGROUND OF THE INVENTION

The present invention relates to the art of power driven threading machines and, more particularly to chucks for gripping a workpiece such as a rod or pipe and rotating the workpiece during the cutting, reaming and/or threading thereof.

Power driven thread cutting machines are well known and basically comprise a rotatable chuck assembly for supporting and rotating a workpiece, a tool carriage supporting tools for performing work in the rotating workpiece, and a drive unit for rotating the chuck assembly and thus the workpiece. The chuck assembly generally includes a tubular spindle having an axis of rotation and axially opposite ends, and a plurality of workpiece engaging jaw members pivotally supported at the opposite ends of the spindle for displacement radially inwardly and outwardly of the spindle axis between closed and open positions with respect to a workpiece introduced through the spindle. The jaw members on the spindle provide for a workpiece to be gripped at axially spaced apart locations along the length thereof and, in the closed positions of the jaws the workpiece is held in a centered position coaxial with the spindle. The spindle and jaws are rotatable as a unit to rotate the workpiece relative to the tool carriage which usually carries a cutting tool, a reaming tool and a thread cutting die head. When the jaws are in the open positions thereof, the workpiece is released and is adapted to rest on the inner periphery of the tubular spindle. The spindle diameter is such that the chuck assembly is adapted to grip and support workpieces having different diameters up to a given maximum diameter which is less than the inner diameter of the spindle. A drive unit is provided for the chuck assembly and, in connection with initiating operation of the threading machine, the jaws are generally pivoted relative to the spindle and into engagement with a workpiece positioned in the spindle, after which the workpiece and chuck assembly are driven together by the drive unit through the jaws. Upon completion of the cutting, reaming and/or threading operation, the direction of the drive is reversed, whereby the jaws pivot outwardly of the spindle axis to release the workpiece.

A variety of arrangements for pivotally supporting and driving the chuck jaws and chuck assembly have been provided heretofore. Such arrangements have included the individual pivotal mounting of the jaws by pins on a rotatable spindle component and the pivotal displacement of the jaws by a drive member coaxial with the spindle and having a camming interengagement with the jaws. An arrangement of this character is disclosed in U.S. Pat. No. 2,916,290 to Skillin. In other similar arrangements heretofore provided, as disclosed in U.S. Pat. No. 3,232,629 to Obear for example, the jaws are provided with gear teeth and are pivotally displaced by a drive member in the form of a ring gear. Both such arrangements require identical component parts at opposite ends of the spindle to drive the jaw members at the corresponding spindle end. Other arrangements heretofore proposed have provided for the jaw members at opposite ends of the spindle to be secured to opposite ends of a common drive rod pivotally supported by the spindle and pivoted by a structurally complex drive arrangement between the opposite ends of the rod. Such an arrangement is shown in U.S. Pat. No. 3,270,492 to Behnke and disadvantageously imposes bending forces on the rods in that the workpiece and chuck assembly are driven through the rods. Further, such an arrangement requires either an undesirably heavy supporting arrangement for the rods along the length thereof or undesirably large rods to accommodate the loads imposed thereon. In yet another arrangement heretofore proposed, as shown in U.S. Pat. No. 2,890,888 to Damijonaitis, the jaws are pivotally mounted on the spindle by means of corresponding pins, and the corresponding jaws at opposite ends of the spindle are pivoted relative to the spindle by means of common rods therebetween which are displaced circumferentially of the spindle by a drive member intermediate the opposite ends thereof. This arrangement also imposes undesirable bending loads on the rods in connection with the driving of the chuck mechanism with a workpiece therein.

All of the foregoing arrangements are undesirably heavy and expensive because of the structural complexity thereof. Additionally, many of the arrangements are subject to relaxing the grip of the jaws relative to the workpiece when the power is turned off, whereby the initially obtained positional centering of the workpiece relative to the spindle axis may be lost when the machine is restarted to complete work on the same workpiece. Most importantly in connection with the disadvantages of the foregoing drive arrangements is the fact that the gripping forces of the jaws against the workpiece at opposite ends of the spindle may not at all and in any event do not consistently either match one another or meet the requirements for supporting and rotating the workpiece with out slippage relative to the jaws. More particularly in this respect, if the workpiece gripping jaws at opposite ends of the spindle are actuated either by corresponding drive components or by common drive components, engagement of the jaws at one end of the spindle with the workpiece and with a given gripping force can be achieved prior to engagement of the jaws at the other end of the spindle with the workpiece to provide the same or a desired gripping force. In any event, such uneven gripping forces against the workpiece at opposite ends of the spindle promotes instability with respect to rotational support of the workpiece which can result in slippage of the workpiece relative to the chuck assembly during a threading operation and/or eccentric rotation of the workpiece and, consequently, the cutting of an unacceptable thread and possible damage to the thread cutting tools.

Yet another disadvantage with respect to chuck mechanisms heretofore provided resides in the fact that at least some manual assistance is required in connection with positioning the workpiece coaxially with respect to the spindle axis during displacement of the jaws from the open to the closed positions thereof about the workpiece. This is especially true in connection with workpieces which are of a small diameter relative to the inner diameter of the spindle. More particularly in this respect, if the workpiece is positioned at rest on the inner surface of the spindle, the jaws in moving from the open to the closed positions thereof either will not engage the workpiece, or engage the workpiece and jam in attempting to move the workpiece, and/or undesirably damage the workpiece or become damaged by engagement therewith. Either of the latter can result in misalignment between the workpiece and spindle axis when the workpiece is finally gripped and rotated by the jaws. Therefore, to avoid these potential problems, the workpiece is most often manually held in substantially centered relationship with the spindle during displacement of the jaws into driving engagement therewith.

SUMMARY OF THE INVENTION

In accordance with the present invention, an improved workpiece gripping and rotating chuck is provided by which the foregoing and other disadvantages of such devices heretofore provided are either minimized or overcome. More particularly, and in accordance with one aspect of the invention, a chuck is comprised of a plurality of jaws at the front end of the spindle, which is the end adjacent to the end of a workpiece to be machined, and each of the front jaws is drivingly connected to a corresponding rear jaw at the other end of the spindle by a corresponding rod which is mounted on the spindle for pivotal displacement about a rod axis parallel to the spindle axis. The front and rear jaws are rigidly secured to the corresponding rod, and the front jaws are driven to pivot radially inwardly and outwardly of the spindle axis between open and closed positions relative to a workpiece positioned in the spindle. The rear jaws are individually and directly pivoted by the front jaws through the corresponding rods which operate in effect as torsion bars between the front and rear jaws. Accordingly, the rear jaws can be angularly positioned on the rods relative to the corresponding front jaws to assure a matching of the gripping forces of the workpiece at opposite ends of the spindle when the front jaws are driven into engagement with the workpiece. In addition to providing the desired matching of forces, the arrangement according to the present invention minimizes the component parts and the sizes thereof, thus providing for economical production and maintenance.

The desired gripping force by the front jaws and thus the rear jaws is preferably achieved by driving the front jaws through a cam and follower interengagement between the front jaws and a drive member axially adjacent thereto and which cam and follower arrangement includes a cam track configured to provide the desired gripping force with respect to each of a number of different diameter workpieces which can be accommodated by the spindle. By directly and individually driving each rear jaw by the corresponding front jaw and thus obtaining the desired matched gripping force, it will be appreciated that concentric alignment of the workpiece with the spindle axis is obtained and maintained consistently. Moreover, such drive together with the driving of the workpiece and chuck by the front jaws and through the cam and follower arrangement assures obtaining the desired gripping force with respect to a given diameter workpiece to preclude slippage between the workpiece and chuck jaws during cutting, reaming and threading of the workpiece.

In accordance with another aspect of the invention, the chuck is provided with an arrangement by which workpieces can be positioned in resting engagement with the interior surface of the spindle and automatically displaced to a centered position with respect to the spindle axis during displacement of the chuck jaws from the open to the closed positions in which the jaws engage and drive the workpiece and the chuck. Preferably, such a centering arrangement is provided by components mounted on the chuck jaws for displacement therewith. The centering components are contoured to initially engage a workpiece resting on the inner surface of the spindle upon closing movement of the jaws and to thereafter cradle and displace the workpiece to its centered position. Therefore, centering of the workpiece is not only achieved automatically in connection with operation of the chuck but is achieved independently of any damaging interengagement or contact between the workpiece and the workpiece engaging portions of the jaws.

It is accordingly an outstanding object of the present invention to provide improvements in connection with threading machine workpiece supporting and rotating chuck assemblies of the character including a plurality of pivotal jaw members for releaseably engaging and rotating a workpiece to be machined.

Another object is the provision of a chuck assembly of the foregoing character which includes pairs of jaw members at opposite ends of a tubular spindle interconnected and driven in a manner for the gripping forces thereof against a workpiece to be matched.

Yet another object is the provision of a chuck assembly of the foregoing character wherein the jaw members at opposite ends of the spindle are interconnected by a rod and wherein the front jaws are driven and, together with the corresponding rods, provide the only drive for the rear jaws.

Still another object is the provision of a chuck assembly of the foregoing character which promotes consistently obtaining desired gripping forces at axially spaced apart locations along a workpiece so as to obtain and maintain centering of the workpiece relative to the chuck axis and stability of the support thereof during machining of the workpiece.

A further object is the provision of a chuck assembly of the foregoing character which is structurally simple and economical to produce and maintain.

Still a further object is the provision of an arrangement by which a workpiece is automatically centered relative to workpiece gripping jaw members of a chuck assembly and in response to displacement of the jaw members towards gripping relationship with the workpiece.

Yet a further object is the provision of an arrangement of the foregoing character by which a workpiece is adapted to be and centered in a manner which precludes potentially damaging interengagement between the jaw members and workpiece during such centering of the latter.

Still another object is the provision of centering finger components mountable on the chuck jaws for pivotal displacement therewith to achieve the centering of the workpiece during closure of the jaws against the workpiece.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawing in which:

FIG. 6 is an exploded perspective view of a front jaw and finger unit of the chuck assembly; and, FIG. 7 is an exploded perspective view of a rear jaw and finger unit of the chuck assembly.

DESCRIPTION OF PREFERRED EMBODIMENTS

Referring now in greater detail to the drawings wherein the showings are for the purpose of illustrating preferred embodiments of the invention only and not for the purpose of limiting the invention, FIG. 1 somewhat schematically illustrates a power driven threading machine comprising a chuck assembly C to be described in detail hereinafter rotatably supported by a spindle housing SH which is mounted on the upper end of a transmission housing TH which in turn is supported on a machine frame or base B which is only partially shown in FIG. 1. Chuck assembly C includes a tubular spindle S rotatably supported in spindle housing SH and provided at its front and rear ends with front and rear jaw units FJ and RJ, respectively, which are rotatable with the spindle and adapted to grippingly engage, support and rotate a workpiece W such as a pipe to be threaded. For this purpose, and as will become more apparent hereinafter, spindle S supports a jaw actuating and chuck drive collar DC which is adapted to be driven such as by a sprocket chain SC which, in turn, is driven by a motor M and, preferably, through a multiple speed transmission T disposed in transmission housing TH. A suitable transmission in this respect is disclosed in my co-pending patent application Ser. No. 123,717, filed Nov. 23, 1987, now U.S. Pat. No. 4,757,598 issued July 19, 1988 and assigned to the same assignee as the present application, and the disclosure of which is incorporated herein by reference. While such a multiple speed transmission is preferred, it will be appreciated that the chuck assembly can be driven by any suitable single speed or multiple speed arrangement.

Figure 1:
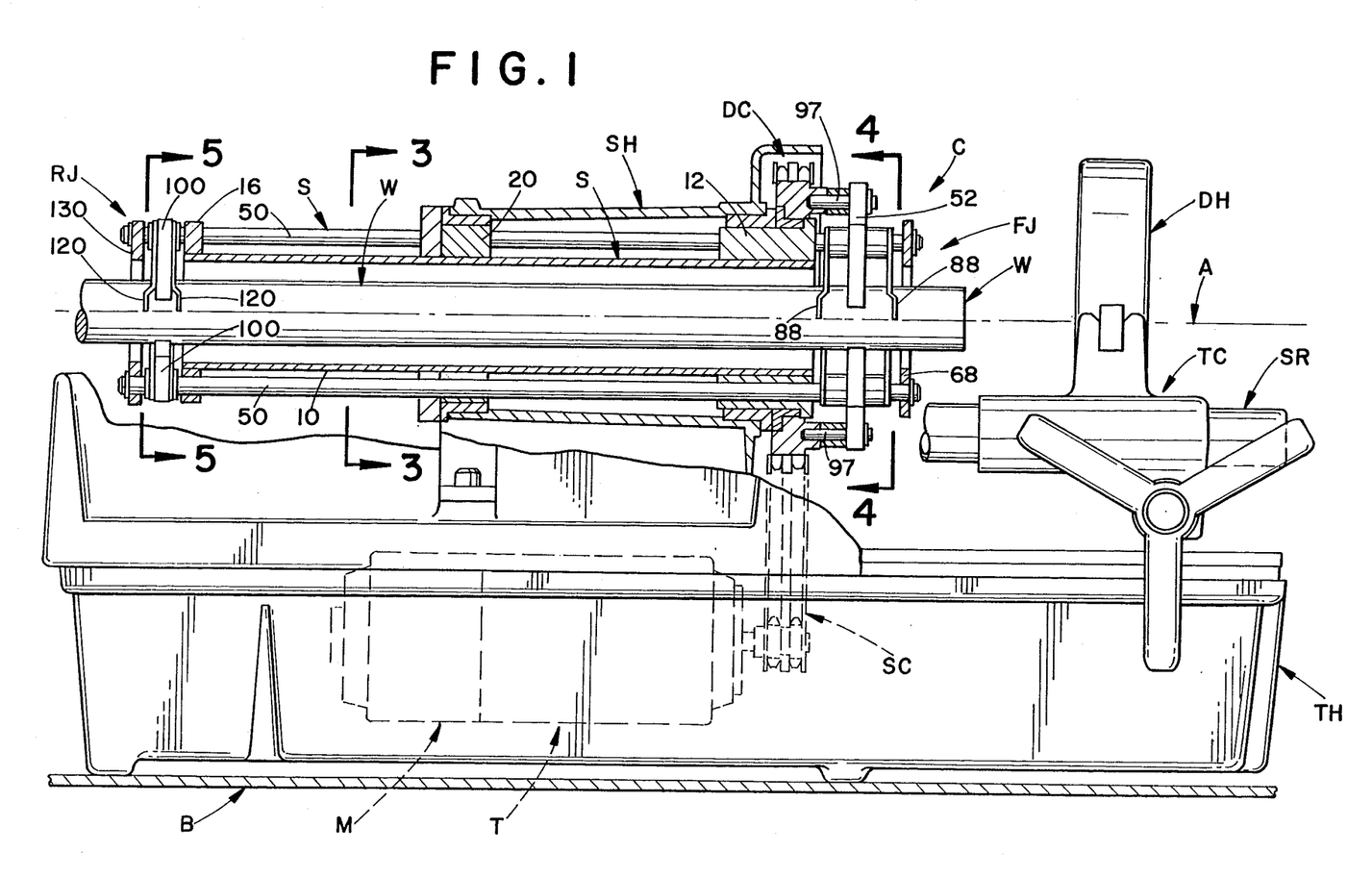
FIG. 1 is a side elevation view of a power driven threading machine provided with a chuck assembly according to the present invention.

Spindle housing SH is provided along its laterally opposite sides with tubular openings receiving corresponding support rods SR which, in a well known manner, are adapted to support a tool carriage TC which carries a thread cutting die head unit as schematically shown in FIG. 1 and designated DH. As is further well known, tool carriage TC is adapted to be moved axially along support rods SR toward and away from the front end of the chuck assembly and the corresponding end of workpiece W, whereby the die head is adapted to thread the workpiece end during rotation of the chuck assembly and thus the workpiece about the chuck or machine axis A with which the die head is coaxially positioned. While not shown, it will be appreciated that tool carriage TC may also support additional tools for performing work such as cutting and reaming operations on workpiece W.

With reference now in particular to FIGS. 2-5 of the drawing, spindle S is comprised of a spindle tube 10 coaxial with chuck axis A and having a front end 10a and a rear end 10b. Front end 10a is provided with an annular collar 12 secured thereto by means of a set screw 14, and rear end 10b is provided with a collar 16 secured thereto by means of a set screw 18. A collar 20 surrounds tube 10 intermediate the opposite ends thereof and is secured to the tube such as by a set screw 22. Spindle housing SH includes a tubular wall portion 24, and the spindle tube is supported for rotation therein by means of a pair of annular bearings 26 and 28 interposed between wall 24 and collars 12 and 20, respectively. A spindle retainer and drag brake arrangment is provided on the rear side of sleeve 20 and is comprised of a plurality of arcuate segments 30 axially slidably secured to collar 20 by corresponding bolts 32 and biased toward sleeve 20 by corresponding coil spring 34. An annular friction plate 36 is interposed between segments 30 and the opposing face of bearing 28 for the purpose set forth hereinafter. Drive collar DC is an annular plate member surrounding collar 12 and supported thereon for rotation relative to the collar and thus spindle tube 10 by means of an annular bearing member 38, and the outer periphery of the drive collar is provided with sprocket teeth 40 to accommodate sprocket chain SC by which the chuck assembly is driven in the manner set forth hereinafter.

Collars 12, 20 and 16 respectively provided with axially extending openings 42, 44, and 46 which rotatably receive and support a corresponding jaw rod 50, and the circumferentially opposite ends of retainer and brake segments 30 are provided with recesses 48 to accommodate the rods. Each rod 50 is pivotal about a corresponding rod axis parallel to chuck axis A, and each rod has a front end 50a and a rear end 50b extending axially beyond the corresponding end of spindle tube 10. As will be appreciated from FIGS. 3-5 of the drawing, rods 50 and thus the openings therefor in the several collars and segments 30 are equally spaced apart about axis A, and the front end 50a of each rod supports a corresponding front jaw of front jaw unit FJ while the rear end 50b of each rod supports a corresponding rear jaw of rear jaw unit RJ. More particularly in this respect, and as will be appreciated from FIGS. 2, 4 and 6 of the drawing, each front jaw includes a jaw member 52 having an opening 54 therethrough receiving end 50a of the corresponding jaw rod 50. Jaw member 52 is secured to end 50a of the jaw rod by means of a pin 56 having a square head 58. Pin 56 extends through an opening 60 therefore in end 50a of the pivot rod, and head 58 engages in a slot 62 in the jaw member. Spacer sleeves 64 and 66 are positioned on axially opposite sides of jaw member 52 and respectively engage against collar 12 and an annular front jaw support plate 68 having openings 70 through which each of the rod ends 50a extends. While plate 68 is not shown in FIG. 4, it will be appreciated therefrom and from FIGS. 1 and 2, that plate 68 circumferentially interconnects the outer ends of the rods to provide stability thereof against bending when the jaw members engage and drive a workpiece. The jaw members, spacer sleeves and plate 68 are maintained in axially assembled relationship relative to spindle tube end 10a by means of a spring clip 72 on the outermost end of each rod. Each front jaw member 52 is provided with a channel shaped jaw shoe 74 having axially opposite sides 76 receiving portion 78 of the jaw member therebetween and having an arcuate toothed workpiece engaging surface 80 facing radially inwardly with respect to chuck axis A.

Each jaw member further includes a corresponding centering finger component 82 mounted on the jaw member for displacement therewith. More particularly, centering finger component 82 includes a pair of axially spaced apart legs 84 axially outwardly overlying the corresponding sides 76 of shoe 74, an integral bridging portion 86 between legs 84, and a pair of arcuate centering fingers 88 extending from legs 84. Fingers 88 are spaced from the corresponding jaw rod and extend outwardly from and generally perpendicular to the outer end of the workpiece engaging surface 80 of shoe 74. Portion 78 of jaw member 52, legs 76 of jaw shoe 74 and legs 84 of centering finger component 82 are provided with aligned apertures, not designated numerically, by which the shoe and finger component are removably mounted on portion 78 of the jaw member by means of pins 90.

Centering finger component 82 is preferably made from spring steel and serves the purpose set forth more fully hereinafter. Jaw member 52 is further provided with a stop pin 92 secured in an opening 94 therefore in the jaw member and which stop pin serves the purpose set forth hereinafter. Finally, each jaw member 52 is provided with an elongate arcuate cam slot 96 extending therethrough and receiving a corresponding jaw drive pin 97 mounted on an annular axially forwardly extending portion 98 of drive collar DC for displacement with the drive collar about axis A. Pin 97 and cam slot 96 cooperate to drive the corresponding jaw member about the axis of the corresponding rod 50 as described hereinafter, and stability against relative axial displacement between pin 97 and slot 96 during such driving of the jaw and driving of the chuck assembly thereby is provided by a washer and spring clip assembly 99 on pin 97.

Figure 2:
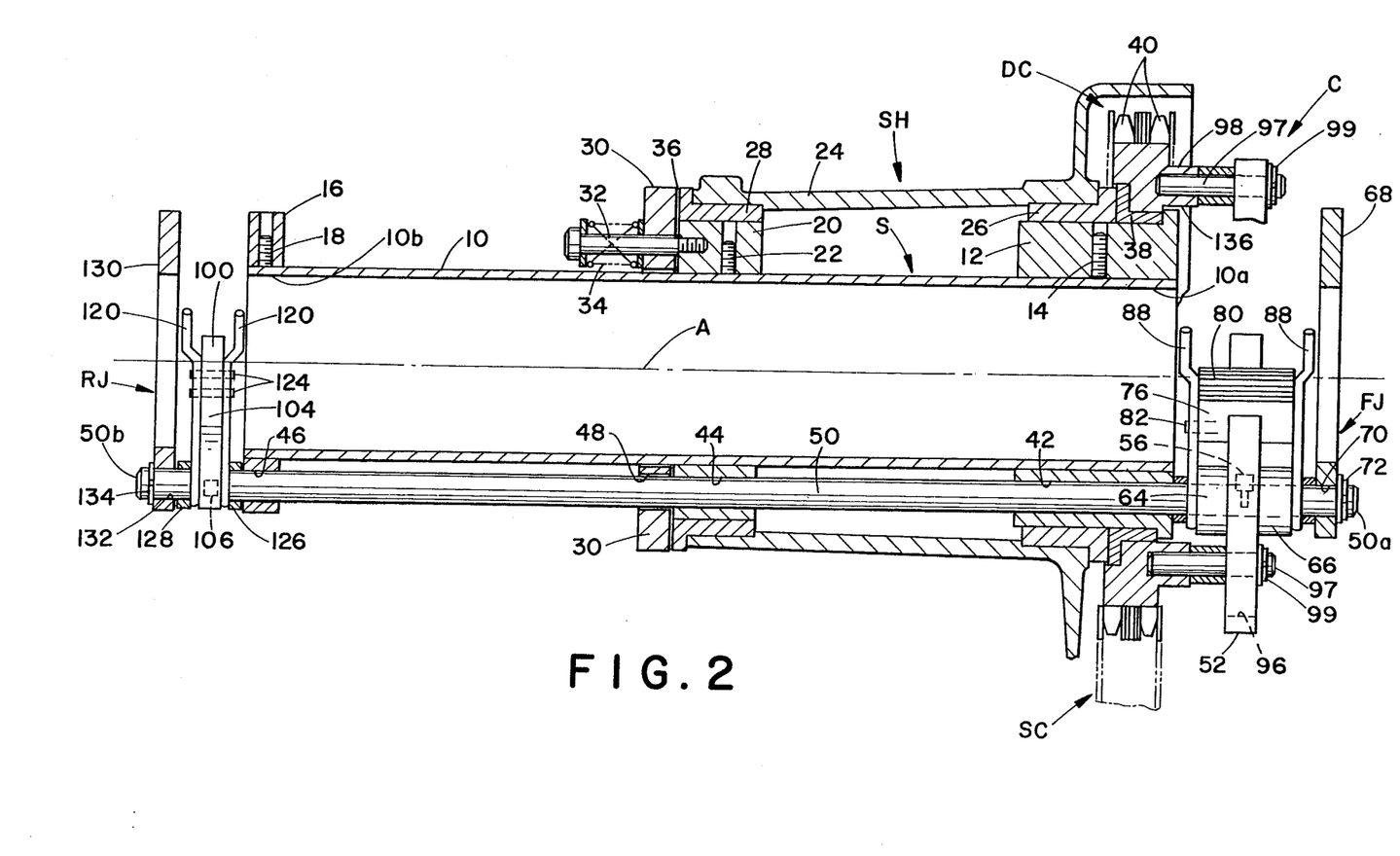
FIG. 2 is a sectional side elevational view of the chuck assembly.
Figure 3:
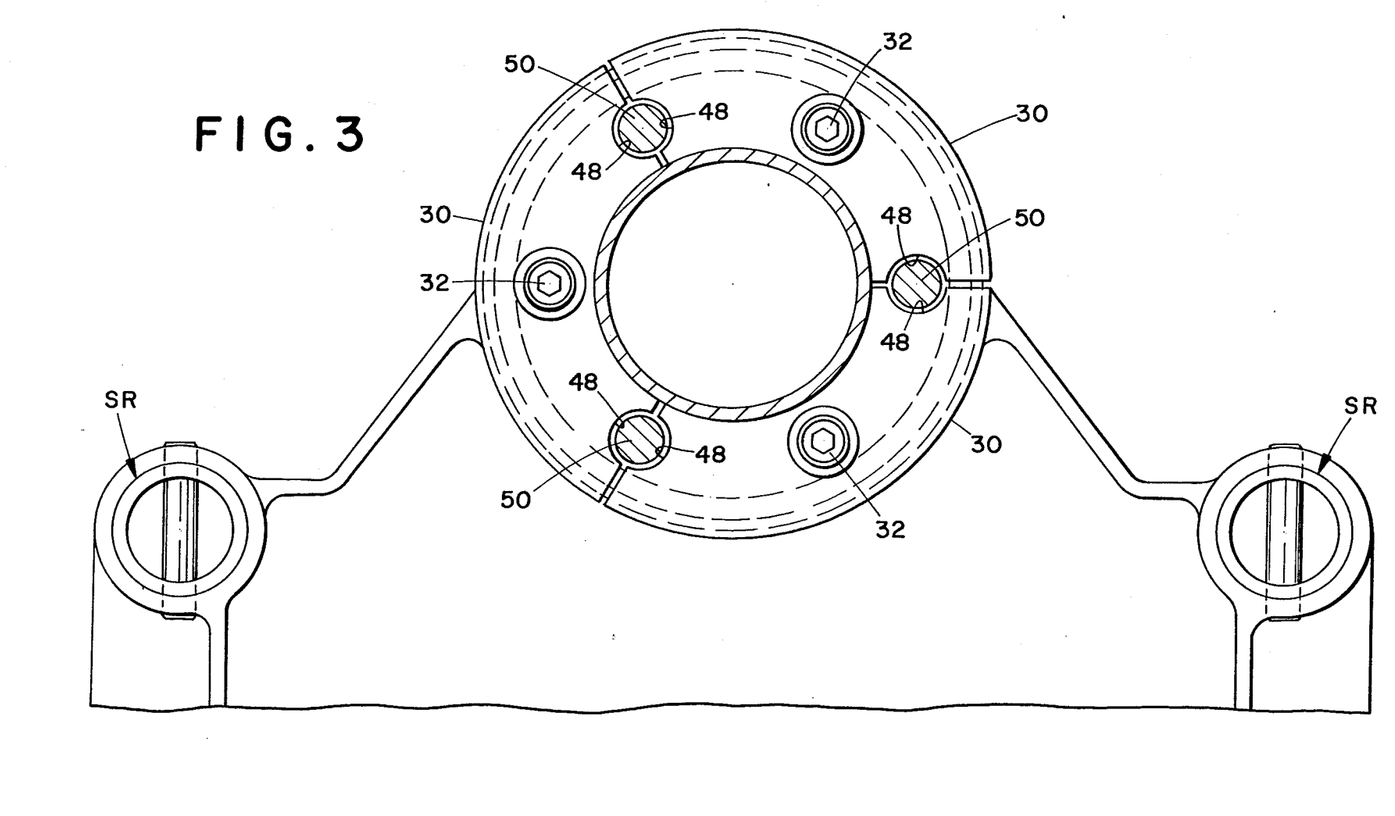
FIG. 3 is a cross-sectional view of the chuck assembly taken along line 3—3 in FIG. 1.
Figure 5:
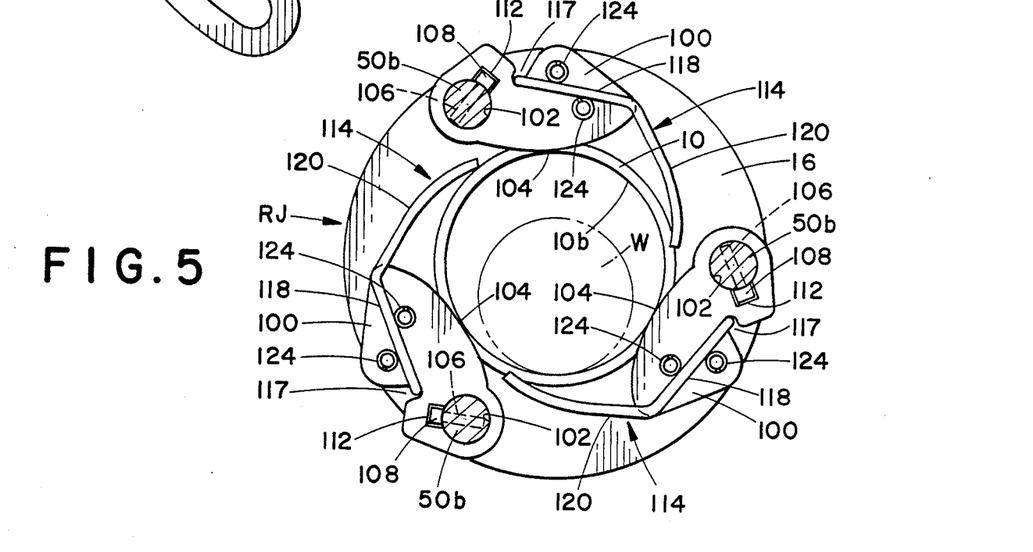
FIG. 5 is a sectional rear end elevation view taken along line 5—5 in FIG. 1 and showing the rear chuck jaws in the open positions thereof.
Figures 6, 7:
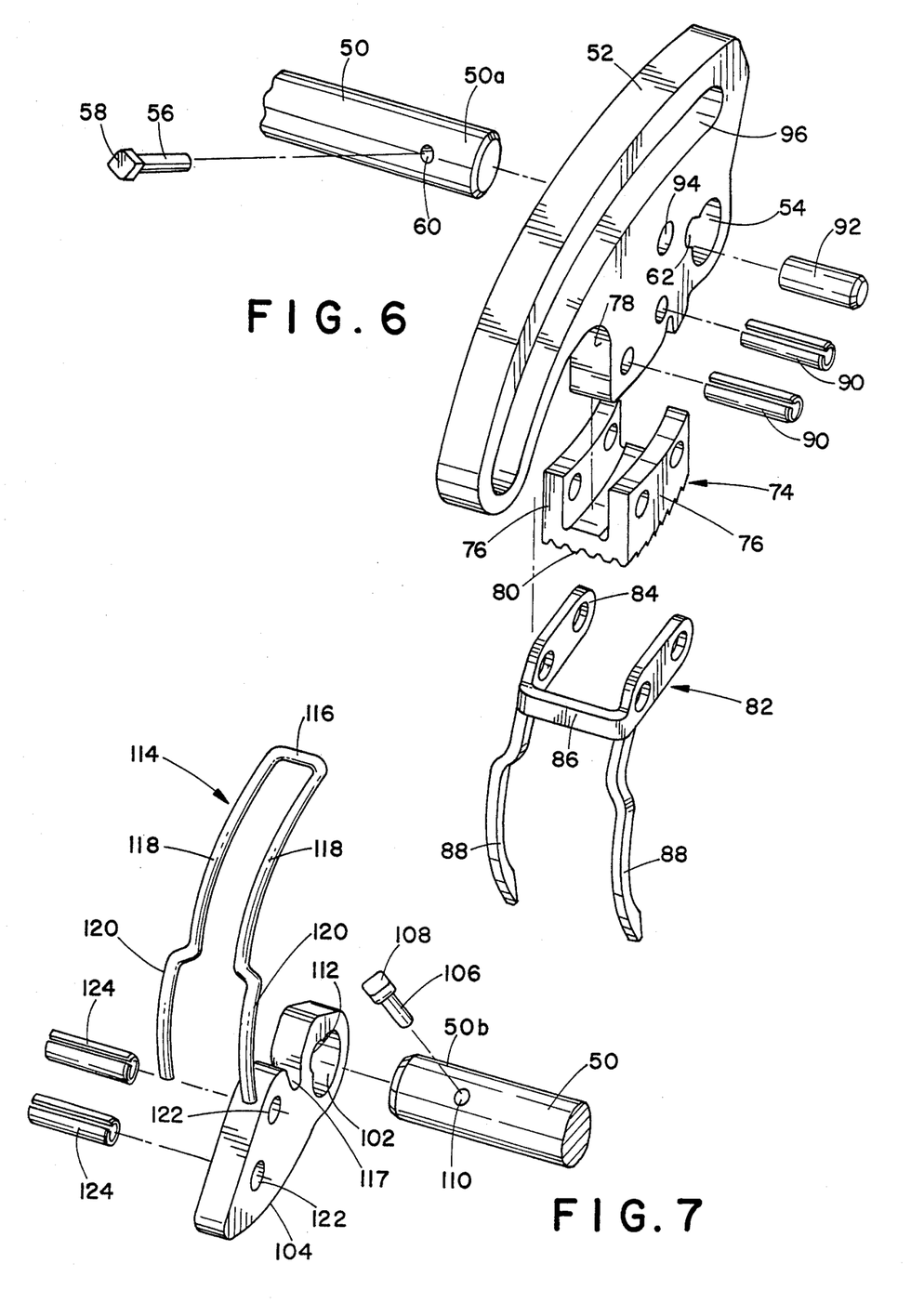

As will be appreciated from FIGS. 2, 5 and 7 of the drawing, each rear jaw of rear jaw unit RJ includes a jaw member 100 having an opening 102 therethrough receiving end 50b of the corresponding jaw rod 50 and having an arcuate workpiece engaging surface 104 which, in the embodiment disclosed, is smooth and faces radially inwardly with respect to chuck axis A. Jaw member 100 is secured to the corresponding rod end by means of a pin 106 having a square head 108. Pin 106 extends through an opening 110 therefor in rod end 50b, and head 108 is received in a slot 112 in the jaw member. Each rear jaw member further includes a corresponding centering finger component 114 which is preferably constructed from spring wire. Finger component 114 includes a bridging portion 116 received in a slot 117 provided therefor in the jaw member, first leg portions 118 disposed on axially opposite sides of jaw member 100, and second leg portions 120 extending from the leg portions 118. Legs 120 extend outwardly from and generally perpendicular to the corresponding jaw surface 104 at a location laterally spaced from the axis of the corresponding jaw rod. Jaw member 100 is provided with a pair of openings 122 extending axially therethrough and receiving pins 124 and, as will be appreciated from FIGS. 2 and 5, pins 124 have ends extending axially outwardly of the opposite sides of jaw member 100 and positioned on opposite sides of first leg portions 118 so as to retain the centering finger component in place on the jaw member. Spacer sleeves 126 and 128 are disposed on axially opposite sides of each jaw member 100 and respectively between the jaw member and an annular jaw rod support plate 130 having openings 132 through which rod ends 50b extend. Plate 130 serves the same purpose as support plate 68 at the front ends of rods 50. The rear jaw members, spacer sleeves and plate 130 are maintained in assembled relationship with respect to end 10b of the spindle tube by means of spring clips 134 on the outermost end of each rod.

Figure 4:
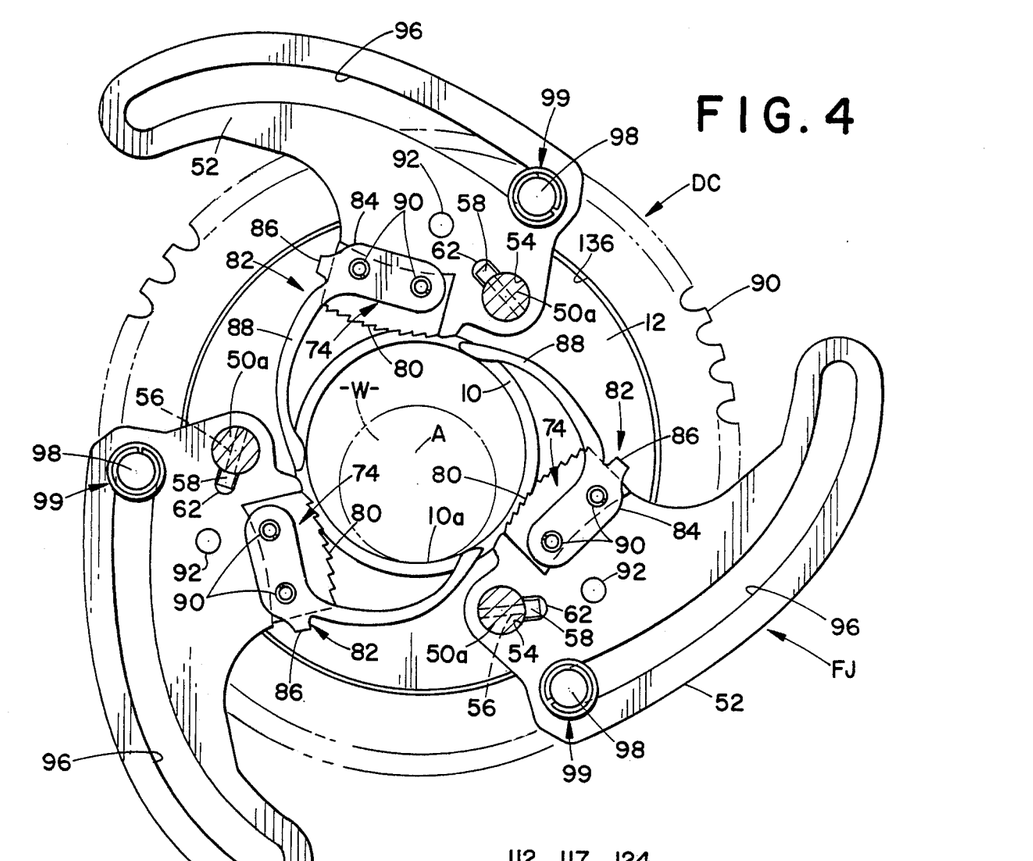
FIG. 4 is a sectional front end elevation view of the chuck assembly taken along line 4—4 in FIG. 1 and showing the front chuck jaws in the open positions thereof.

In operation, a workpiece W to be threaded is introduced through spindle tube 10 with the front and rear jaw members in the open positions thereof shown in FIGS. 4 and 5. Assuming the workpiece to be of a length whereby its center of gravity is between the opposite ends of the spindle tube 10, the workpiece rests on the bottom of the spindle tube. The drive mechanism for the machine is then operated in the direction to cause pivotal closure of the front and rear jaw members relative to machine axis A which, as will be appreciated from FIG. 4, is counterclockwise about the axes of the jaw rods in the latter figure. Accordingly, such displacement of the jaw members is achieved by rotating drive collar DC counterclockwise in FIG. 4. As mentioned hereinabove, bearing 38 supports drive collar DC for pivotal displacement relative to the spindle tube, whereby it will be appreciated that initial displacement of the drive collar and pins 97 mounted thereon causes the front jaw members to pivot counterclockwise about the axes of rods 50 and thus radially inwardly of chuck axis A as pins 97 move along cam slots 96 in the jaw members. To assure such initial relative displacement between the jaw members and spindle tube, friction plate 36 between bearing 28 and spring biased segments 30 provides a drag brake arrangement which restrains rotation of the spindle. Furthermore, as will be appreciated from the foregoing description, pivotal displacement of the front jaw members in the foregoing manner pivots jaw rods 50 to in turn pivot the rear jaw members clockwise as seen in FIG. 5 and thus radially inwardly of chuck axis A.

As the front and rear jaw members pivot in the direction of jaw closure relative to workpiece W, the centering finger components on the front and rear jaw progressively converge relative to chuck axis A much in the manner of a camera iris and, in doing so, cooperate to cradle and displace workpiece W into position concentric with axis A. It is believed that the latter will be apparent from FIG. 4 wherein it will be appreciated that the centering finger component 82 of the front jaw which is closest to the bottom of the spindle tube will initially pass under the workpiece and, as it progresses in its converging relationship relative to chuck axis A will engage and roll the workpiece W to the left in FIG. 4 such that the workpiece is cradled between the fingers 88 and surface 80 of the corresponding jaw shoe 74. Until such time as all three faces 80 of jaw shoes 74 engage the outer surface of workpiece W, the latter occurring when the workpiece is positioned coaxially with axis A, the workpiece is progressively displaced towards the latter position by the foregoing cradled relationship. It will be appreciated of course that the corresponding cradled relationship and elevation of the workpiece is simultaneously achieved by the corresponding rear jaw members and the centering finger components thereof. Further in regard to the centering finger feature, it will be appreciated that if the workpiece is of such length that its center of gravity is at some point rearwardly of spindle tube end 10b, the workpiece will rest in the spindle at an angle to horizontal engaging to bottom of the spindle tube at end 10b and the top at end 10a. Thus, the rear fingers cradle and draw the workpiece downwardly toward axis A which the front fingers simultaneously raise the workpiece toward axis A. Therefore, reference herein to the workpiece engaging the inner periphery of the spindle tube when the jaws are open is with reference to both possibilities, namely horizontal engagement with the bottom of the tube or the engagement occurring when the workpiece is angled to horizontal as described above. Still further, insofar as the centering finger feature is concerned, if the workpiece is shorter than the distance between the front and rear jaws, the front fingers alone will center the workpiece during jaw closure.

When the workpiece is positioned concentrically with axis A and engaged by surfaces 80 of the front jaw shoes 84 and surfaces 104 of rear jaw member 100, further rotation of drive collar DC and thus pins 97 relative to cam slots 96 is precluded, whereupon the drag brake effect of friction plate 36 is overcome and the drive collar is effective through pins 97 to drive the front jaw members and thus the spindle tube, rear jaw members and workpiece W about chuck axis A while a threading operation is performed on the workpiece. When the threading operation has been completed, the machine drive is stopped and reversed, whereby drive collar DC rotates clockwise in FIG. 4 to displace pins 97 relative to jaw members 52 to pivot the latter clockwise about the axes of jaw rods 50 to return the jaws to the open positions thereof. In connection with such opening movement of the jaws, workpiece W is progressively released by the centering fingers for engagement with the interior of the spindle tube. As will be appreciated from FIGS. 2 and 4, the annular projection 98 on drive collar DC provides the drive collar with an annular shoulder 136 radially inwardly adjacent drive pins 97 and, in connection with opening movement of the front jaws, stop pins 92 thereon are positioned to engage against shoulder 136 so as to limit opening displacement of the jaw members.

It will be appreciated from the foregoing description that each of the front jaw members 52 and the corresponding jaw rod 50 provides the only driving connection between drive collar DC and the corresponding rear jaw member 100, whereby the rear jaws are individually and directly driven by the front jaws through the corresponding jaw rod. Accordingly, the rear jaws can be angularly positioned on jaw rods 50 relative to the corresponding front jaws to assure a matching of the gripping forces of the workpiece at opposite ends of the chuck assembly when the front jaws are driven radially inwardly to engage the workpiece. In this respect, for example, each of the rear jaws can be offset about two degrees relative to the corresponding front jaw and in the direction which provides for the rear jaws to engage the workpiece prior to engagement of the front jaws therewith. This, through the torsion rod effect on rods 50 provides the desired gripping force by the rear jaws to maintain coaxial alignment between the workpiece and chuck axis A. Moreover, the driving of the front jaws through the pin and cam slot arrangement described above and the ultimate driving of the workpiece and chuck assembly directly through the front jaws by the drive pins provides a highly efficient application of driving force against the workpiece during a threading operation. In particular in this respect, cam slots 96 are contoured to provide the desired gripping force for each of the number of different diameter workpieces which can be accommodated in the chuck assembly. Further, by having the drive collar and front jaws axially adjacent one another at the front end of the chuck assembly, such application of force is achieved with optimum loading of the components parts and with effective application and distribution of forces between the machine drive unit and chuck assembly.

While considerable emphasis has been placed herein on the structures and structural interrelationships between the component parts of the preferred embodiments, it will be appreciated that other embodiments can be devised and that many modifications can be made in the preferred embodiments without departing from the principals of the present invention. In particular, it will be understood that the jaw mounting and drive arrangement is operable to provide the desired workpiece gripping and supporting function during machine operation without the centering finger components which are preferred in that they eliminate the necessity for manual positioning of a workpiece during closure of the jaws thereabout. Likewise, it will be appreciated that the centering finger components as disclosed herein, or appropriately modified, can be employed with the pivotal jaw members of chuck assemblies of other machines to provide the automatic centering function disclosed herein. Still further, it will be appreciated that front and rear jaw configurations other than those disclosed herein can be devised, and that other arrangements for pivoting the front jaw members radially inwardly and outwardly of the chuck axis can be devised while maintaining the primary feature of fixedly securing corresponding front and rear jaws to a common jaw rod such that the rear jaw is individually and directly driven by the front jaw through the jaw rod therebetween. The foregoing and other modifications as well as other embodiments of the invention will be suggested to those skilled in the art upon reading the foregoing description of the preferred embodiment, whereby it is to be distinctly understood that the foregoing descriptive matter is to be interpreted merely as illustrative of the invention and not as a limitation.

Having thus described the invention, it is claimed:

1. A workpiece chuck comprising, spindle tube means having a spindle axis and axially spaced apart front and rear ends, front and rear workpiece jaw members, means respectively supporting said front and rear jaw members on said front and rear ends of said spindle tube means for pivotal displacement about corresponding jaw member axes parallel to said spindle axis, drive means for pivotally displacing said front and rear jaw members about said jaw member axes radially inwardly and outwardly of said spindle axis, said spindle tube means having an inner periphery and said front and rear jaw members being pivotal inwardly and outwardly of said spindle axis between closed and open positions, said jaw members including workpiece engaging means, said workpiece engaging means in said closed positions of said jaw members engaging a workpiece extending through said spindle tube means in a centered position with respect to said spindle axis, said workpiece in said open positions of said jaw members being in a resting position against said inner periphery, and means separate from said workpiece engaging means and pivotal with said front and rear jaw members for displacing said workpiece from said resting to said centered position during pivotal movement of said jaw members from said open to said closed positions thereof.

2. A chuck according to claim 1, wherein said means pivotal with said jaw members includes centering finger means on each said front and rear jaw member.

3. A chuck according to claim 2, wherein each said front and rear jaw members has axially opposite sides, and said finger means include fingers on each of said axially opposite sides of each said front and rear jaw members.

4. A chuck according to claim 2, wherein each said finger means is detachably mounted on the corresponding jaw member.

5. A chuck according to claim 1, wherein said means supporting said front and rear jaw members includes a plurality of rods extending axially along said spindle tube means and being equally spaced apart about said spindle axis and supported on said spindle tube means for pivotal movement relative thereto about corresponding rod axes parallel to said spindle axis, each of said rods having front and rear ends, said front and rear workpiece jaw members being secured respectively to said front and rear ends of each of said rods for pivotal displacement therewith about the corresponding rod axis.

6. A chuck according to claim 5, wherein said drive means includes drive plate means coaxial with said spindle tube means and supported on said front end thereof for pivotal displacement relative thereto in opposite directions about said spindle axis, and means interengaging said drive plate means and said front jaw members for said pivotal displacement of said drive plate means to pivot said front jaw members inwardly and outwardly of said spindle axis, whereby said rear jaw members are pivotally displaced radially inwardly and outwardly of said spindle axis by said front jaw members through said rods.

7. A chuck according to claim 6, and collar means on each of said front and rear ends of said spindle tube means, said collar means being apertured to pivotally support said rods.

8. A chuck according to claim 7, wherein said drive plate means includes an annular drive plate member surrounding and pivotally supported on said collar means on said front end of said spindle tube means.

9. A chuck according to claim 8, wherein said means interengaging said drive plate means and front jaw members includes cam and follower means.

10. A chuck according to claim 9, wherein said cam and follower means includes a pin on said drive plate means for each said front jaw member and cam track means on each said front jaw member for the corresponding pin.

11. A chuck according to claim 10, wherein said cam track means includes a slot in each said front jaw member receiving said pin.

12. A chuck according to claim 5, and front and rear collar means respectively on said front and rear ends of said spindle tube means, openings axially through said front and rear collar means receiving and pivotally supporting said rods, said front collar means having a circular outer periphery, and said drive means including annular drive plate means surrounding and pivotally supported on said outer periphery of said front collar means.

13. A chuck according to claim 12, wherein said drive means further includes a pin on said drive plate means for each said front jaw member and extending axially outwardly of said front end of said spindle tube means, and cam track means on each said front jaw member receiving the corresponding pin.

14. A chuck according to claim 13, wherein said cam track means includes a slot opening axially through said front jaw member and extending laterally relative to the corresponding rod axis.

15. A chuck according to claim 13, wherein said means pivotal with said jaw members includes centering finger means on each said front and rear jaw member.

16. A chuck according to claim 15, wherein each said front and rear jaw members has axially opposite sides, and said finger means include fingers on each of said axially opposite sides of each said front and rear jaw members.

17. A chuck according to claim 15, wherein each said finger means is detachably mounted on the corresponding jaw member.

18. A chuck according to claim 17, wherein said cam track means includes a slot opening axially through said front jaw member and extending laterally relative to the corresponding rod axis.

19. In a workpiece chuck including tubular support means having an axis and a workpiece receiving opening therethrough coaxial with said axis and having an inner periphery, a plurality of jaw members mounted on said support means for pivotal movement inwardly and outwardly of said axis between closed and open positions, said jaw members including workpiece engaging means, said workpiece engaging means in said closed positions of said jaw members being adapted to support a workpiece in said opening in a centered position coaxial with said axis, and said workpiece in said open positions of said jaw members being in a resting position against said inner periphery of said opening, the improvement comprising: means separate from said workpiece engaging means and movable with said jaw members for displacing said workpiece from said resting to said centered position during pivotal movement of said jaw members from said open to said closed positions thereof.

20. A chuck according to claim 19, wherein said means movable with said jaw members includes a plurality of workpiece centering finger means displaceable radially inwardly and outwardly relative to said axis respectively during movement of said jaw members radially inwardly and outwardly of said axis.

21. A chuck according to claim 19, wherein said jaw members are pivotal about corresponding jaw axes and said means movable with said jaw members includes means pivotal with said jaw members about said jaw axes.

22. A chuck according to claim 19, wherein said means movable with said jaw members includes means mounted on each of said jaw members and pivotal therewith.

23. A chuck according to claim 22, wherein said means on each of said jaw members includes centering finger means.

24. A chuck according to claim 23, wherein each said finger means is detachably mounted on the corresponding jaw member.

25. A chuck according to claim 24, wherein each of said jaw members is pivotal about a corresponding jaw axis and includes axially opposite sides and a workpiece engaging jaw edge between said sides and radially facing said axis of said support means, said jaw edge providing said workpiece engaging means, said finger means including fingers on said opposite sides of said jaw member and extending outwardly from said jaw edge at a location therealong spaced from the corresponding jaw axis.

26. A chuck according to claim 23, wherein each said jaw member is pivotal about a corresponding jaw axis and said finger means includes fingers spaced from the corresponding jaw axis and extending generally transverse thereto.

27. A chuck according to claim 23, wherein each of said jaw members is pivotal about a corresponding jaw axis and includes axially opposite sides and a workpiece engaging jaw edge between said sides and radially facing said axis of said support means, said jaw edge providing said workpiece engaging means, said finger means including fingers on said opposite sides of said jaw member and extending outwardly from said jaw edge at a location therealong spaced from the corresponding jaw axis.

28. A chuck according to claim 27, wherein said finger means is of one piece construction, said fingers on said opposite sides of said jaw member being connected by a bridging portion therebetween.

29. A chuck according to claim 23, wherein each of said jaw members has axially opposite sides and said finger means includes fingers on each of said axially opposite sides.

* * * * *